(12) United States Patent
Chen

(10) Patent No.: US 7,567,433 B2
(45) Date of Patent: Jul. 28, 2009

(54) PORTABLE COMPUTER WITH A HIDDEN KEYBOARD

(75) Inventor: Hsiang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/808,617

(22) Filed: Jun. 12, 2007

(65) Prior Publication Data

US 2008/0310088 A1    Dec. 18, 2008

(51) Int. Cl.
*G06F 1/16* (2006.01)
(52) U.S. Cl. .............................. 361/679.26; 361/679.09; 361/679.27; 312/223.1; 312/223.2; 248/917
(58) Field of Classification Search ......... 361/679–683; 312/223.1, 223.2, 333; 400/679, 682, 691–693; 248/917–923
See application file for complete search history.

(56) References Cited

U.S. PATENT DOCUMENTS

| | | | | |
|---|---|---|---|---|
| 5,287,245 A | * | 2/1994 | Lucente et al. | 361/680 |
| 5,548,478 A | * | 8/1996 | Kumar et al. | 361/681 |
| 6,016,176 A | * | 1/2000 | Kim et al. | 349/84 |
| 6,128,186 A | * | 10/2000 | Feierbach | 361/683 |
| 6,351,372 B1 | * | 2/2002 | Kim | 361/683 |
| 6,700,773 B1 | * | 3/2004 | Adriaansen et al. | 361/680 |
| 6,862,171 B1 | * | 3/2005 | Maskatia et al. | 361/683 |
| 7,342,776 B1 | * | 3/2008 | Chan | 361/680 |
| 2003/0095375 A1 | * | 5/2003 | Lai et al. | 361/683 |
| 2005/0057891 A1 | * | 3/2005 | Madsen et al. | 361/680 |
| 2005/0105256 A1 | * | 5/2005 | Chuang | 361/680 |
| 2006/0104013 A1 | * | 5/2006 | Sakakibara et al. | 361/680 |
| 2006/0227500 A1 | * | 10/2006 | Brandenberg et al. | 361/683 |

\* cited by examiner

*Primary Examiner*—Jayprakash N Gandhi
*Assistant Examiner*—Anthony Q Edwards
(74) *Attorney, Agent, or Firm*—Bacon & Thomas, PLLC

(57) ABSTRACT

The present invention discloses a portable computer with a hidden keyboard, which includes a main system having a display device on one side and a support board pivotally connected to the main system, so that the support board can be turned to integrate with the main system or support the main system on a disposing surface. One end of the support board pivotally connected with the main system has an open slot disposed concavely inward for movably storing a keyboard. Positioning elements disposed between the pivotal ends of the support board and the main system each presses against the main system and the support board, when the support board is turned to support the main system on the disposing surface, to form an included angle therebetween for preventing the main system from tumbling towards the support board due to the heavy weight of the main system.

7 Claims, 5 Drawing Sheets

PORTABLE COMPUTER WITH A HIDDEN KEYBOARD

FIELD OF THE INVENTION

The invention relates to a portable computer, and more particularly to a portable computer having a main system with one end pivotally connected to a support board. One end of the support board pivotally connected with the main system has an open slot disposed concavely inward for movably storing a keyboard, and an included angle formed between the main system and the support board will prevent the main system from tumbling towards the support board due to the weight of the main system.

BACKGROUND OF THE INVENTION

The major electronic manufacturers have emphasized on miniaturization and portability of the portable electronic products in their research and development, and continue to reduce the physical dimension and weight of such products. Consequently, a Ultra-Mobile PC (UMPC) is developed, which is a cross between the PDA and the notebook computer. The UMPC does not require external input devices (such as keyboard, mouse, or writing board), and has all of the necessary functional circuits of the portable electronic products integrated therein. For example, the mouse and the keyboard are replaced by the touch panel as the input device, which not only allows users to operate the computer by using a cursor, inputting text, and displaying graphics, but also attempts to reduce the weight of the UMPC. However, as the general users have not yet become accustomed to editing text by the touch panel, the manufacturers have selectively provided a keyboard along with the touch panel, so that users can still operate the UMPC by using the keyboard.

Although the inclusion of a keyboard has benefited the users, the convenience and portability of the UMPC would be greatly compromised if the keyboard cannot be carried along with the UMPC. On the other hand, if the keyboard is included with the UMPC, because the UMPC is usually heavier than the keyboard, the keyboard cannot support the weight of the UMPC, and the UMPC could easily topple over, subsequently bringing the keyboard down with it. Therefore, users could be truly benefited by the development of a UMPC that includes a keyboard that is not only convenient and portable, but also able to firmly support the touch panel and prevent it from toppling over, and this would also be a major contribution from the industry.

SUMMARY OF THE INVENTION

In light of the above-mentioned shortcomings, a portable computer with a hidden keyboard has been developed and disclosed in this invention, as an attempt to relieve the problems faced by all major manufacturers.

A main objective of the invention is to provide a portable computer with a hidden keyboard, which comprises a main system having a display device, an end of the main system is pivotally connected to a support board. So that the support board can be pivotally turned to integrate with another surface of the main system, or the support board can be pivotally turned away from the main system and placed on a flat surface to support the main system. An end of the support board pivotally connected with the main system has an open slot disposed concavely inward for movably storing a keyboard, such that the keyboard can be moved out of the open slot for use or moved back into the open slot when not used. A pair of positioning components is disposed respectively at two ends of the main system that are pivotally connected to the support board, and each positioning component presses against the main system and the support board when the support board is pivotally turned away from the main system and placed on a flat surface. Subsequently, an included angle is formed between the main system and the support board, and thus the main system will not tumble towards the support board due to the weight of the main system.

BRIEF DESCRIPTION OF DRAWINGS

The structure and the technical means adopted by the present invention to achieve the above and other objects can be best understood by referring to the following detailed description of the preferred embodiments and the accompanying drawings, wherein.

DETAILED DESCRIPTION OF PREFERRED EMBODIMENTS

Figure 1:
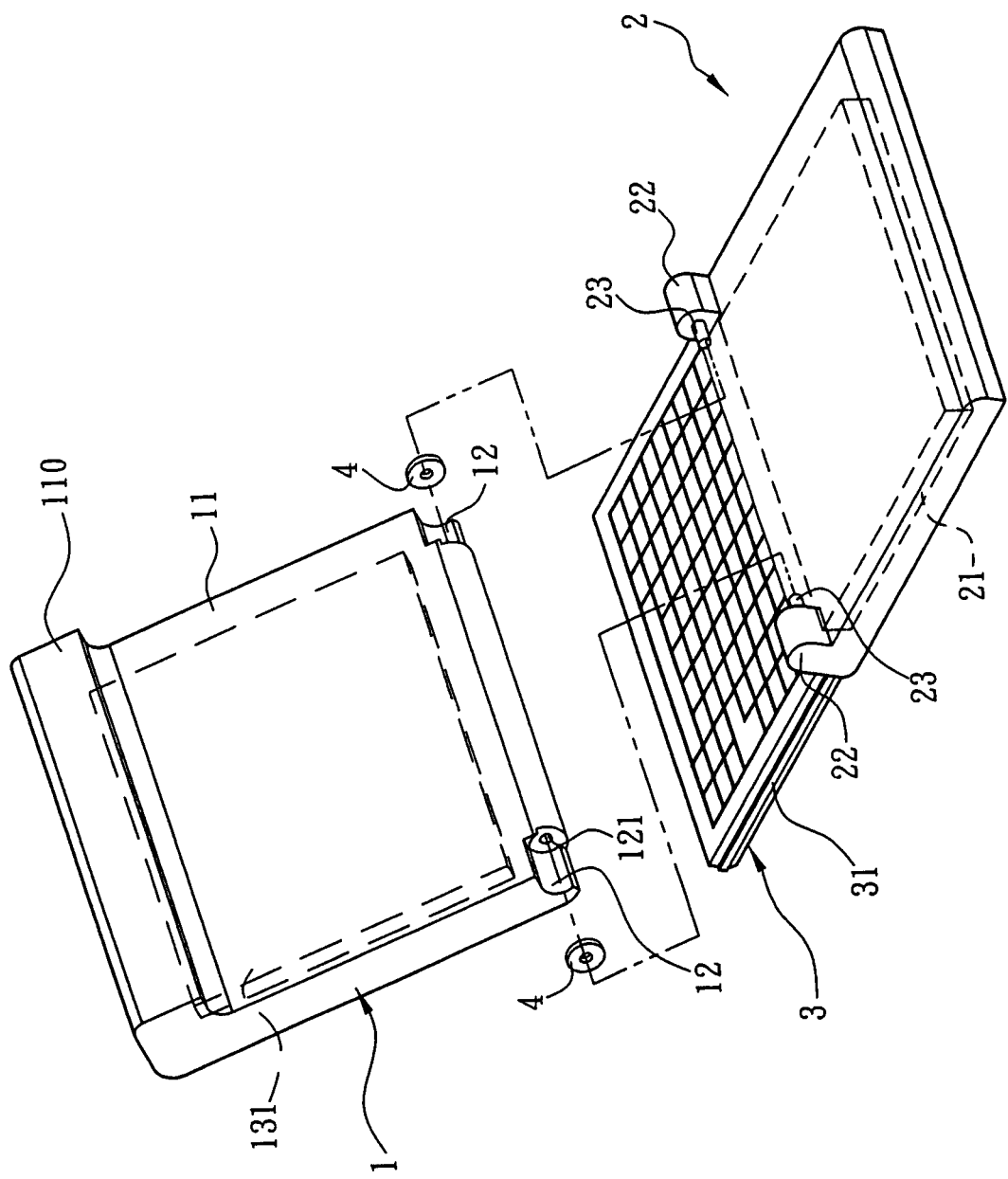
FIG. 1 is a dissected view of a structure according to the invention.
Figure 2:
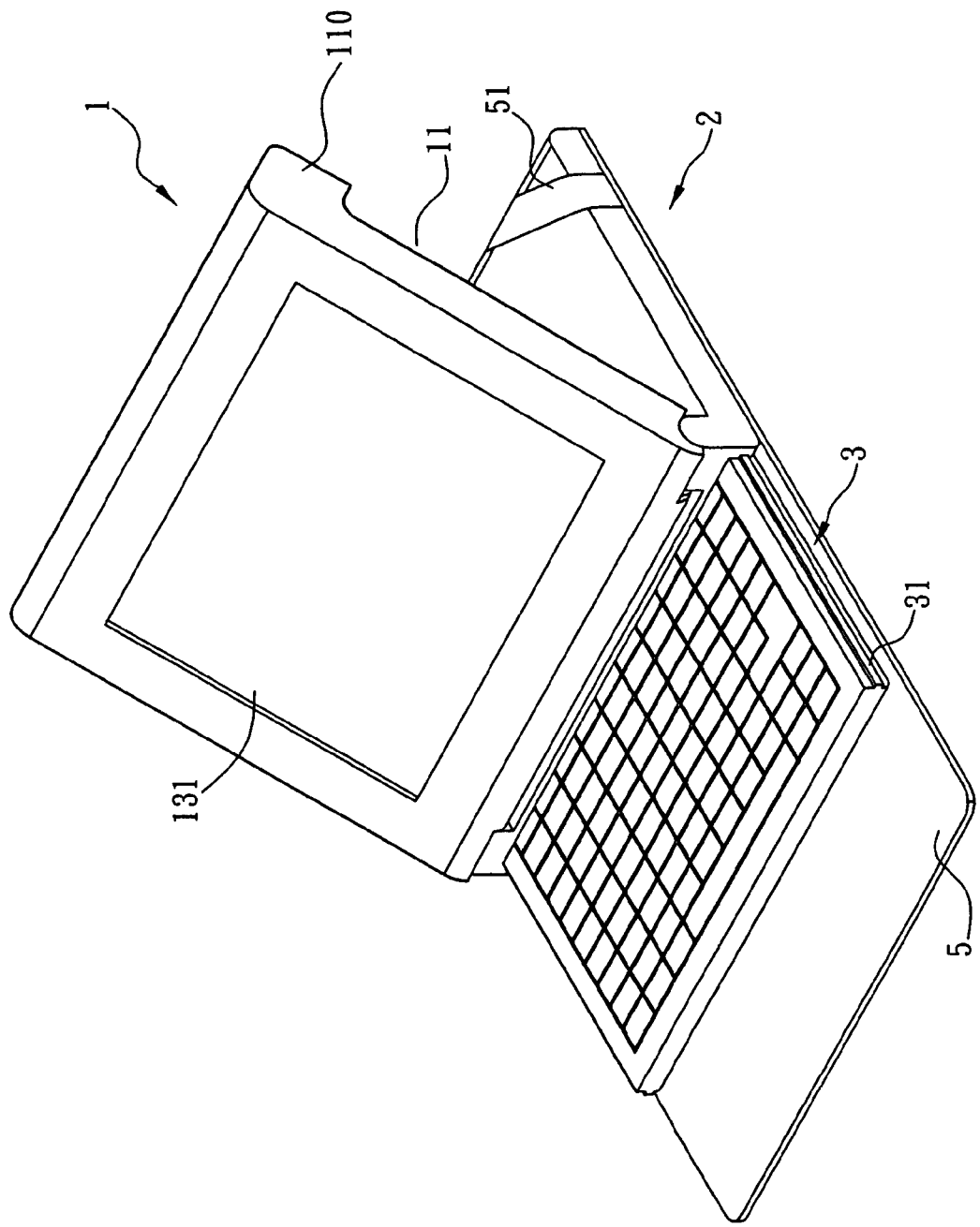
FIG. 2 is a schematic view of a portable computer ready for usage according to the invention.

A portable computer with a hidden keyboard is disclosed in the invention, as shown in FIG. 1 and FIG. 2, which comprises a main system 1 shaped as a board (such as a Ultra Mobile PC), a display device 131 is disposed on a surface of the main system 1 (for example, a LCD panel or a LCD touch screen), and a support board 2 is pivotally connected to an end of the main system 1, so as to allow the support board 2 to be pivotally turned to press against another surface of the main system 1 and become integrated with the main system 1; or pivotally turned away from the main system 1 and be placed on a flat surface. An open slot 21 is disposed concavely inward at an end of the support board 2 that is pivotally connected to the main system 1 for movably storing a keyboard 3, so that the keyboard 3 can be moved out of the open slot 21 for users to operate; or the keyboard 3 can be stored into the open slot 21 for easy transportation or for the main system 1 to be used alone. A positioning component 4 (such as a damper disc or a ratchet wheel) is provided at both ends of the main system, wherein the two ends are pivotally connected to the support board 2. When the support board 2 is pivotally turned away from the main system 1 and placed on a flat surface, the positioning component 4 presses against the main system 1 and the support board 2, so that an included angle is formed between the main system 1 and the support board 2.

Referring again to FIG. 1 and FIG. 2, a lug 22 is respectively convexly disposed at each of the two sides of the support board 2 that are pivotally connected to the main system 1, so as to allow the main system 1 to be pivotally connected between the pair of lugs 22 of the support board 2. A pair of pivots 23 respectively extends from a surface of each of lugs 22 facing the main system 1, and an end of each pivot 23 facing away from each of the lugs 22 passes through each of the positioning components 4 and the two ends of the main system 1. A pair of troughs 12 having one respective through opening 121 is provided on the two ends of the main system 1 that face the positioning components 4, and each trough 12 allows one of the positioning components 4 and one of the lugs 22 to fit in; the pivot 23 of each lug 22 passes through the through opening 121, thereby pivotally connecting the main system 1.

Each of the positioning components 4 may be a damper disc (such as a plastic disc or a rubber disc) with higher frictional coefficient (close to 1); each damper disc is disposed within each of the troughs 12, with one side pressing against the trough 12 and another side pressing against a surface of the lug 22 facing the main system 1. When the support board 2 is turned away from the main system 1, each damper disc causes friction between the trough 12 and the lug 22, thereby preventing the main system 1 from moving further towards the support board 2.

Figure 3:
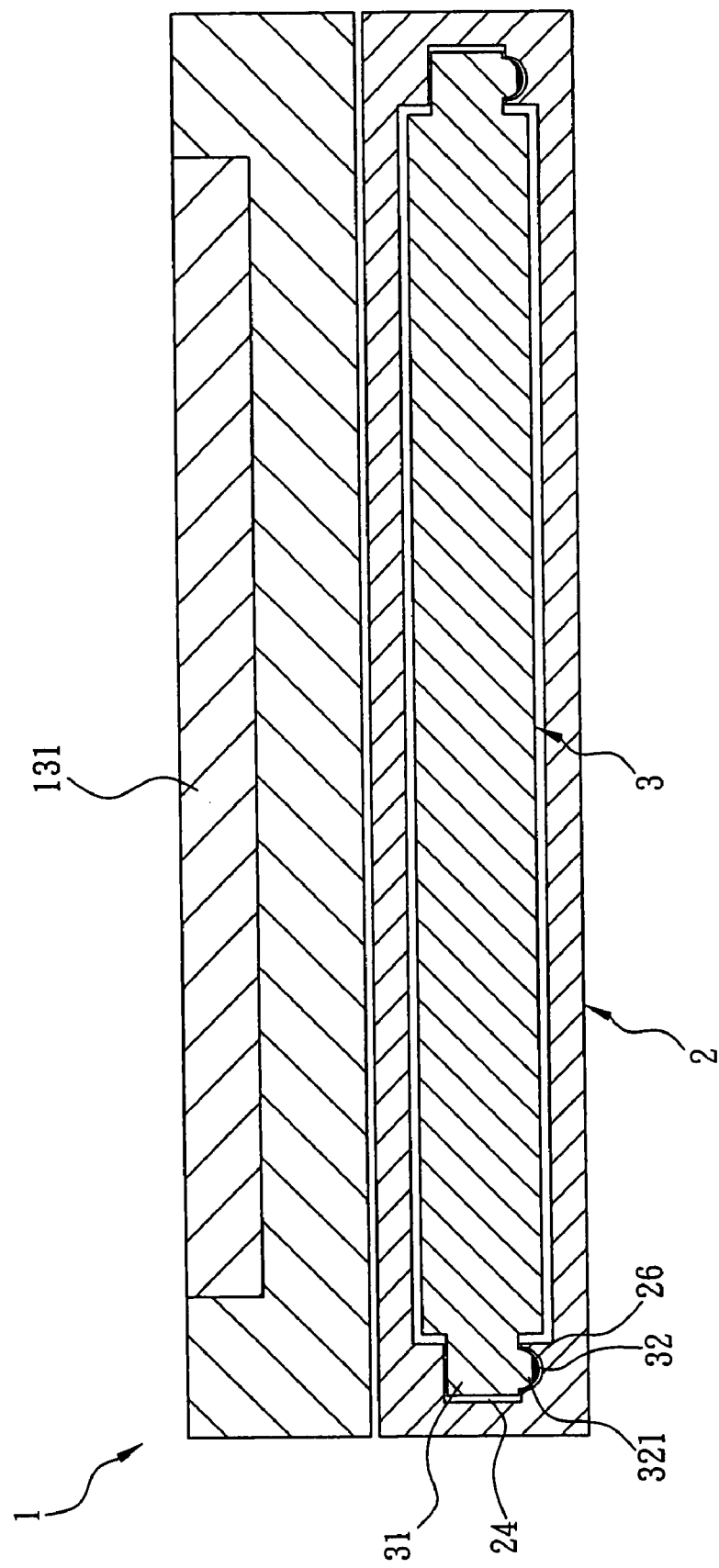
FIG. 3 is a frontal dissected view of the arc-shaped blocks of the portable computer according to the invention, when the keyboard is stored within the open slot.
Figure 4:
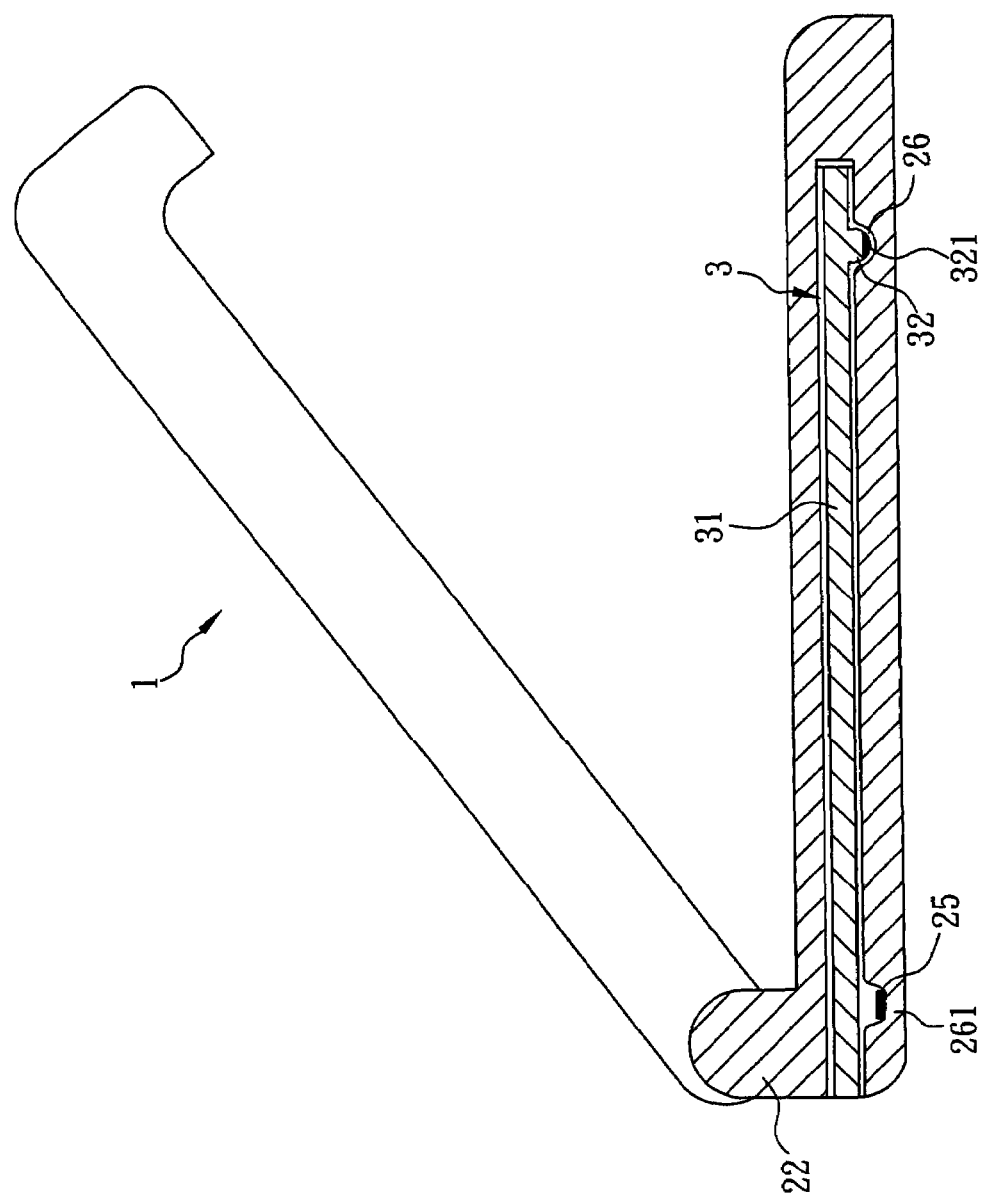
FIG. 4 is a lateral dissected view of the arc-shaped blocks of the portable computer according to the invention, when the keyboard is stored within the open slot.

Referring to FIGS. 1, 3, and 4, a pair of first tracks 24 (such as a concave track or a convex track) is respectively disposed on the two lateral ends of the open slot 21 that face each other; a first arc-shaped trough 25 is correspondingly disposed to an end of each first track 24, while a second arc-shaped trough 26 is correspondingly disposed to another end. The first arc-shaped trough 25 is disposed on the first track 24 adjacent to the opening of the open slot 21, and the second arc-shaped trough 26 is disposed within the open slot 21 distant from the opening. When the keyboard 3 is completely stored into the open slot 21, a position on both sides of the keyboard 3 facing each of the first tracks 24 respectively includes a second track 31 that is engageable with each of the first tracks 24 (such as a concave track or a convex track). A pair of arc-shaped blocks 32 is respectively disposed on each of the second tracks 31, and the arc-shaped blocks 32 are engageable with each of the first arc-shaped troughs 25 and each of the second arc-shaped troughs 26. When the keyboard 3 is completely stored within the open slot 21, the pair of arc-shaped blocks 32 engages with each of the second arc-shaped troughs 26 and becomes secured, so as to prevent the keyboard 3 from moving further into the open slot 21; whereas when the keyboard 3 is completely moved out of the open slot 21, the pair of arc-shaped blocks 32 engages with each of the first arc-shaped troughs 25 and becomes secured, so as to prevent the keyboard 3 from moving further outwards. When the keyboard 3 is joined by the means of the second tracks 31 and the first tracks 24, the second tracks 31 allow the keyboard 3 to move into and out of the open slot 21 via the first tracks 24.

Referring again to FIG. 2, which shows a protective cover 5 (such as a leather cover or a plastic cover) covering the surface of the main system 1 with the display device 131, as well as the surface of the support board 2 that faces away from the main system 1. A surface of the protective cover 5 that faces the support board 2 includes respective securing bands 51 at two corresponding corners; each securing band 51 allows two corresponding corners of the support board 2 to be fitted into the protective cover 5. Moreover, the protective cover 5 movably covers the surface of the main system 1 with the display device 131, so as to protect the main system 1 or the keyboard 3 from dusts.

Furthermore, an end of the main system 1 distant from the pivotal connection with the support board 2 includes a protruding rib 110 extending towards the support board 2, thereby forming a concave portion 11 on the main system 11 adjacent to the protruding rib 110. When the support board 2 is pivotally turned and pressed against another surface of the main system 1, the support board 2 is allowed to fit into the concave portion 11 and press onto an end of the protruding rib 110, thereby integrating the support board 2 with the main system 1.

Figure 5:
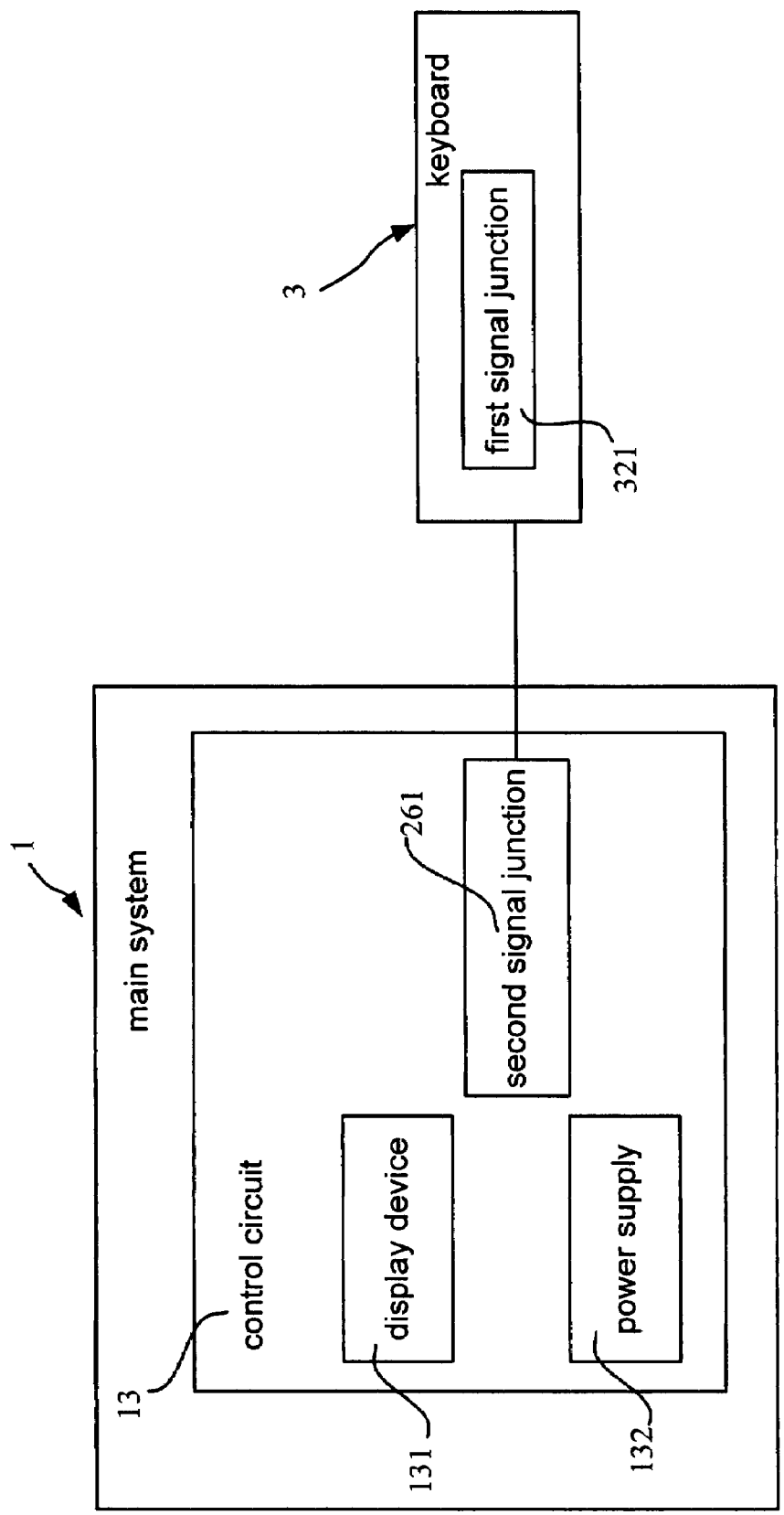
FIG. 5 is a block diagram showing the arrangement of components according to the invention.

In a preferred embodiment of the invention, as shown in FIGS. 3, 4, and 5; at least one of the sides of each arc-shaped block 32 facing the first arc-shaped troughs 25 further comprises a first signal junction 321; and a location within each of the first arc-shaped troughs 25 facing the first signal junction 321 further comprises a second signal junction 261, which is connected to the first signal junction 321. When the keyboard 3 is completely moved out of the open slot 21 (as shown in FIG. 1), each second signal junction 261 is connected to each of the first signal junctions 321, and allowed to receive signals transmitted from the keyboard 3 via the first signal junction 321.

The main system 1 further comprises a control circuit 13 and a power supply 132; the control circuit 13 (comprising a motherboard, a CPU, and other processing units) is disposed inside of the main system 1 and connected to each of the second signal junctions 261 via the support board 2; the control circuit 13 is responsible for all of the basic processing tasks of the main system 1.

The power supply 132 (including a rechargeable battery and an adapter compatible with the power supply system) is disposed inside of the main system 1, and connected to the control circuit 13 for providing the power that allows the main system 1 to function. The control circuit 13 is also connected to the display device 131 to allow the display of information. When the keyboard 3 is completely moved out of the open slot 21, which allows each of the arc-shaped blocks 32 to become engaged with each of the second arc-shaped troughs 26, each first signal junction 321 subsequently connects to each second signal junction 261, and the control circuit 13 is allowed to detect the keyboard 3 via each first signal junction 321 and each second signal junction 261, and thus the control circuit 13 may enter a mode in which it cooperates with the keyboard 3, and receives input signals generated from the keyboard 3. In contrast, when the keyboard 3 is moving towards the inside of the open slot 21, which makes each of the arc-shaped blocks 32 move out of each second arc-shaped trough 26, thus each first signal junction 321 disconnects from each second signal junction 261, and the control circuit 13 becomes unable to detect the keyboard 3, consequently discontinuing its cooperative mode with the keyboard 3.

The present invention has been described with a preferred embodiment and it is understood that many changes and modifications to the described embodiment can be carried out without departing from the scope and the spirit of the invention that is intended to be limited only by the appended claims.

What is claimed is:

1. A portable computer with a hidden keyboard, comprising:
   a main system having a display device disposed on a surface of the main system, and a concave portion disposed on another surface of the main system opposite to the display device, and a pair of troughs each having one through opening located on two ends of the main system respectively;
   a pair of positioning components respectively disposed at the two troughs; and
   a support board having an open slot disposed concavely inward at an end for movably storing a keyboard, and a pair of lugs respectively disposed at two sides of the support board and pivotally connected to the main system to form a pivotal connection with the support board, wherein a surface of each lug facing each of the positioning components has a pivot disposed thereon, an end of each pivot facing away from each of the lugs passes through each of the positioning components and the through openings of the troughs, two first tracks are disposed on two corresponding sides of the open slot respectively, each of the first tracks includes a first arc-shaped trough disposed on a location of the first track adjacent to the opening of the open slot and a second arc-shaped trough disposed on a location of the first track distal to the first arc-shaped trough and the opening of the open slot, the keyboard includes two second tracks disposed on both sides thereof for engaging with the first tracks respectively, and each of the second tracks comprises a pair of arc-shaped blocks disposed on each of the second tracks for engaging with the first arc-shaped troughs or the second arc-shaped troughs; and wherein the end of the support board with the open slot is thereby pivotally connected to the main system, the main system can be pivotally turned to press against a surface of the support board so as to allow the main system to be integrated with the support board, or pivotally turned away from the support board so as to support the main system on a flat surface; each positioning component presses against the main system and the support board when the support board is turned away from the main system and placed on the flat surface, the pair of arc-shaped blocks engages with each of the second arc-shaped troughs when the keyboard is completely stored into the open slot and, when the keyboard is completely moved out of the open slot, the pair of arc-shaped blocks engages with each of the first arc-shaped troughs.

2. The portable computer of claim 1, wherein at least one of the sides of each arc-shaped block facing the first arc-shaped trough further comprises a first signal junction; and a location within each of the first arc-shaped troughs connected to the first signal junction further comprises a second signal junction disposed, when the keyboard is completely moved out of the open slot, each second signal junction is connected to each of the first signal junctions, and allowed to receive signals transmitted from the keyboard via the first signal junction.

3. The portable computer of claim 2, wherein the main system comprises:

a power supply disposed inside of the main system for providing power that allows the main system to function; and a control circuit disposed inside of the main system, and connected to the power supply and to the display device, the control circuit also being connected to each of the second signal junctions via the support board.

4. The portable computer of claim 1, wherein each of the positioning components disposed in the trough is penetrated by the pivot, and a surface of each of the positioning components presses against the trough, while another surface presses against a surface of the lug, and when the concave portion of the main system is turned away from the surface of the support board, the positioning components stop the main system from moving towards the support board.

5. The portable computer of claim 4, wherein the positioning component is a damper disc.

6. The portable computer of claim 4, wherein the positioning component is a ratchet wheel.

7. The portable computer of claim 1, wherein an end of the main system distal to the pivotal connection with the support board and facing away from the display device further comprises a protruding rib, when the another surface of the main system is turned and presses against the surface of the support board, the protruding rib presses against an end of the support board.

* * * * *